Jan. 15, 1924.
G. L. DUNKELBERGER
NURSING BOTTLE
Filed Sept. 29, 1921
1,480,855
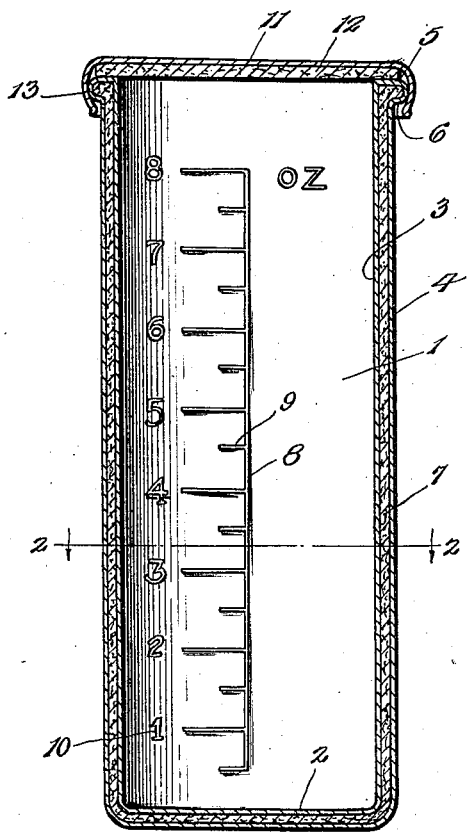
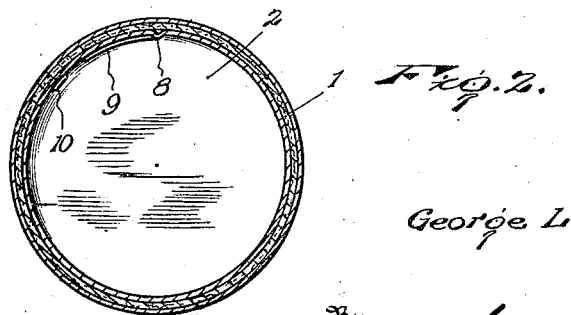
Inventor
George L. Dunkelberger.
By Lacey & Lacey, Attorneys Patented Jan. 15, 1924.

1,480,855

UNITED STATES PATENT OFFICE.

GEORGE L. DUNKELBERGER, OF BILLINGS, MONTANA.

NURSING BOTTLE.

Application filed September 29, 1921. Serial No. 504,220.

*To all whom it may concern:*

Be it known that I, GEORGE L. DUNKELBERGER, a citizen of the United States, residing at Billings, in the county of Yellowstone and State of Montana, have invented certain new and useful Improvements in Nursing Bottles, of which the following is a specification.

The object of this invention is to provide a nursing bottle which will be practically indestructible; will be light so that it may be easily handled by an infant, and will be of such a simple construction that it may be produced at a low cost and easily kept in a sanitary condition. The invention is illustrated in the accompanying drawings and will be hereinafter fully set forth.

In the drawings—

Figure 1 is a diametrical longitudinal section of a nursing bottle embodying the invention;

Fig. 2 is a horizontal section on the line 2—2 of Fig. 1.

In carrying out my invention, I employ a cylindrical receptacle or body, indicated by the reference numeral 1, which is of uniform diameter from end to end, one end being closed, as shown at 2, and the other end being open and constituting a mouth. This cylindrical body is constructed of an inner wall 3 and an outer wall 4 of aluminum or some similar light and cheap metal which may be easily given the desired form. The walls 3 and 4 are united at the mouth of the bottle, as shown at 5, and rolled or otherwise shaped to form a bead 6 having a flat upper seating face. Between the walls of aluminum, I place a filling 7, preferably of granulated cork, so that the bottle will be insulated from the action of heat and may retain its contents at an even temperature for a considerable period. On the inner wall of the bottle, I mold a rib 8 having branches 9 disposed circumferentially of the bottle and constituting graduations, markers 10 being formed in a similar manner upon the inner surface of the bottle opposite some of the graduations so as to readily mark the quantity of milk or other feed placed in the bottle. I also provide a cap consisting of an outer plate 11 of aluminum and an inner filler 12 of cork or other yieldable material adapted to bear against the flat upper seating face of the bead 6 as shown. The cap is provided with a depending rim 13 which is somewhat resilient so that it may be pushed down over the bead 6 and will intimately engage the bead so as to retain the cap in position upon the bottle. The mouth of the bottle will thus be effectually closed and access of hot air or other deleterious vapors or agents will be prevented. When the bottle is to be used, the cap, of course, will be removed and any of the well-known wide-base nursing nipples on the market may be fitted upon the mouth of the bottle.

It will be readily noted that my invention provides a very durable bottle which may be easily cleaned and which may be produced at a low cost. The bottle will be very light in weight so that it may be handled easily by an infant and will not, of course, readily break when the infant tosses it aside.

Having thus described the invention, what is claimed as new is:

A nursing bottle consisting of a cylindrical metallic container having a mouth of the same diameter as the bottom of the container and provided with inner and outer walls of aluminum intimately united at said mouth and being otherwise free throughout their entire extent, the outer wall having an external bead surrounding the mouth of the container and provided with a flat upper seating face and the inner wall having a longitudinal rib formed thereon with branch ribs extending circumferentially therefrom and constituting a scale of measurements visible from the inside of the container only, a heat insulating medium filling the entire space between said walls and a sealing cap having a yieldable filler adapted to rest upon the flat upper seating face of the bead and entirely covering the mouth of the container and having a depending rim embracing the bead on the outer wall of said container.

In testimony whereof I affix my signature.

GEORGE L. DUNKELBERGER. [L. S.]